(12) United States Patent
Nariyoshi et al.

(10) Patent No.: US 8,595,275 B2
(45) Date of Patent: Nov. 26, 2013

(54) PSEUDORANDOM NUMBER GENERATOR AND DATA COMMUNICATION APPARATUS

(75) Inventors: Yuichiro Nariyoshi, Tokyo (JP); Takashi Endo, Tokyo (JP); Seiji Kobayashi, Tokyo (JP)

(73) Assignee: Renesas Electronics Corporation, Kawasaki-shi (JP)

(*) Notice: Subject to any disclaimer, the term of this patent is extended or adjusted under 35 U.S.C. 154(b) by 1208 days.

(21) Appl. No.: 12/422,120

(22) Filed: Apr. 10, 2009

(65) Prior Publication Data

US 2009/0271463 A1 Oct. 29, 2009

(30) Foreign Application Priority Data

Apr. 25, 2008 (JP) ................. 2008-115085

(51) Int. Cl.
*G06F 1/02* (2006.01)
*G06F 7/58* (2006.01)

(52) U.S. Cl.
USPC .......................................... 708/250; 708/252

(58) Field of Classification Search
None
See application file for complete search history.

(56) References Cited

U.S. PATENT DOCUMENTS

| | | | | |
|---|---|---|---|---|
| 5,090,035 | A * | 2/1992 | Murase | 377/72 |
| 5,446,683 | A * | 8/1995 | Mullen et al. | 708/256 |
| 5,867,409 | A * | 2/1999 | Nozuyama | 708/252 |
| 6,014,446 | A * | 1/2000 | Finkelstein | 380/46 |
| 7,567,620 | B2 * | 7/2009 | Rozental | 375/260 |
| 2003/0074380 | A1 * | 4/2003 | Shona | 708/250 |

FOREIGN PATENT DOCUMENTS

| | | |
|---|---|---|
| JP | S63-204919 | 8/1988 |
| JP | 2003-122560 A | 4/2003 |

OTHER PUBLICATIONS

Chu et al., "Design Techniques of FPGA Based Random Number Generator", Proc. Military and Aerospace Applications of Programming Devices and Techniques Conference, 1999.*
Gierlichs et al., "Susceptibility of eSTREAM candidates towards side channel analysis", SASC '08 Workshop Record, pp. 123-150, 2008.*
Akashi Sato, "Design Wave Magazine", February issue, 2006, (CQ publishing Co., Ltd) "special issue 2: protection LSI from bugging", Chapter 2, "Understanding How Side-Channel Attacks Work" (pp. 105 to 114).
Office Action (Notification of Reasons for Refusal) issued Oct. 18, 2012, in Japanese Patent Application No. 2008-115085 (with English translation).

* cited by examiner

*Primary Examiner* — Michael Hicks
(74) *Attorney, Agent, or Firm* — Miles & Stockbridge P.C.

(57) ABSTRACT

The present invention is directed to improve leak analysis resistance by improving randomness of a pseudorandom number. A pseudorandom number generator as a representative embodiment of the invention includes a shift resistor obtained by coupling a plurality of flip flop circuits and can generate a pseudorandom number by shifting signals by the shift register synchronously with a clock signal. A shift amount changing circuit capable of changing a shift amount in the shift register in accordance with a control signal supplied from the outside of the pseudorandom number generator is provided. By changing the shift amount in the shift register in accordance with a control signal supplied from the outside of the pseudorandom number generator by the shift amount changing circuit, it becomes difficult to make outputs of the pseudorandom number generator the same. By using such a pseudorandom number generator, leak analysis resistance can be improved.

6 Claims, 7 Drawing Sheets

PSEUDORANDOM NUMBER GENERATOR AND DATA COMMUNICATION APPARATUS

CROSS-REFERENCE TO RELATED APPLICATIONS

The disclosure of Japanese Patent Application No. 2008-115085 filed on Apr. 25, 2008 including the specification, drawings and abstract is incorporated herein by reference in its entirety.

BACKGROUND OF THE INVENTION

The present invention relates to a pseudorandom number generator and a data communication apparatus on which the pseudorandom number generator is mounted.

As described in, for example, "Design Wave Magazine", February issue, 2006, (CQ publishing Co., Ltd) "special issue 2: protection LSI from "bugging", chapter 2, understanding of mechanism of side channel attack" (pp. 105 to 114), since a microcomputer for an IC card is mounted on a card for finance, traffic, health insurance, and the like and electronic money and personal information is stored, it is necessary to prevent leakage of information, an attack of falsification by a combination of hardware and software. One of attacks to the microcomputer for an IC card is leak analysis. The leak analysis is an analyzing method such that, since current consumption in a microcomputer taking no countermeasure depends on a change in data, by observing leak of current consumption or the like, a change of data is estimated.

The leak analysis is a method of estimating a key by determining whether current is generated (whether data changes) in a specific location by calculation sequentially with respect to all of candidates of a key on input data, on the other hand, measuring current while changing an input, comparing the currents, and repeating the operation. A representative countermeasure against the leak analysis is a method called "masking". The masking is a method of executing encryption by exclusive-OR operation between data and a random number, and eliminating correlation between consumption current and a change in the data by using the encryption. The masking is an effective countermeasure in both hardware and software. To generate a random number as mask data, a pseudorandom number generator is used. The pseudorandom number generator is configured by an LFSR (Linear Feedback Shift Register) for feeding back data by an exclusive-OR gate to a shift register. However, when the number of clocks of the LFSR is the same, mask data also has the same value. Consequently, leak analysis resistance deteriorates.

Japanese Unexamined Patent Publication No. 2003-122560 discloses a technique of generating a random number having high irregularity by using data transmitted via a data input/output terminal (SIO terminal) in an LFSR. An exclusive-OR operation between serial data transmitted via the SIO terminal and an output of a first shift register 203 is performed. A result of the operation is input to a second shift register 204.

Usually, a set signal for setting a logic value "1" is supplied to each of flip flop circuits in the LFSR for a period since power-on until external resetting cancellation. However, even when the set signal or a reset signal for resetting the logic value to "0" is not supplied, the same value tends to be set at power-on because of the characteristic of a process, and different values are not assured each time. In the case where the set signal or the like is not supplied, there is the possibility that values all of which are "0" become initial values. In this case, even when a clock signal is supplied, the value of the LFSR is not updated. In the case where initialization is not performed, there is the possibility that it is difficult to carry out an operation check test.

In the leak analysis, in operation of the DES (Data Encryption Standard), AES (Advanced Encryption Standard), and the like, an attacker has to know a plain text or cipher text and has to enter a plurality of sentences (up to millions of sentences) in encryption operation (if values are different, an arbitrary text is sufficient). It is easier for an attacker who wishes to perform leak analysis to make a transmission path (cipher text) whose external terminal is seen and observe leak when a cipher text on the transmission path is decoded than a method of altering a microcomputer and generating a plan text. Therefore, in a microcomputer for an IC card and the like, further improvement in leak analysis resistance is demanded.

An object of the present invention is to provide a technique for improving leak analysis resistance by improving randomness of pseudorandom numbers.

The above and other objects of the present invention and novel features will become apparent from the description of the specification and the appended drawings.

Outline of representative inventions out of inventions disclosed in the application will be briefly described as follows.

A pseudorandom number generator as a representative embodiment of the invention includes a shift resistor obtained by coupling a plurality of flip flop circuits and can generate a pseudorandom number by shifting signals by the shift register synchronously with a clock signal. A shift amount changing circuit capable of changing a shift amount in the shift register in accordance with a control signal provided from the outside of the pseudorandom number generator is provided. By changing the shift amount in the shift register by the shift amount changing circuit in accordance with the control signal supplied from the outside of the pseudorandom number generator, it becomes difficult to make outputs of the pseudorandom number generator the same. By using such a pseudorandom number generator, leak analysis resistance can be improved.

An effect obtained by the representative invention of inventions disclosed in the application will be briefly described as follows.

By improving randomness of a pseudorandom number, further improvement in the leak analysis resistance can be realized.

DESCRIPTION OF PREFERRED EMBODIMENTS OF THE INVENTION

1. Representative Embodiment

First, outline of a representative embodiment of the present invention disclosed in the application will be described. Reference numerals in the drawings referred to with parentheses in description of the outline of the representative embodiment just illustrate components included in the concept of components to which the reference numerals are designated.

[1] A pseudorandom number generator (208) as a representative embodiment of the invention includes a shift resistor (151) obtained by coupling a plurality of flip flop circuits (101 to 107) and can generate a pseudorandom number by shifting signals by the shift register synchronously with a clock signal. A shift amount changing circuit (154) capable of changing a shift amount in the shift register is provided. By changing the shift amount in the shift register by the shift amount changing circuit, it becomes difficult to make outputs of the pseudorandom number generator the same. By using an output of the pseudorandom number generator as mask data for leak analysis, leak analysis resistance can be improved.

[2] In the pseudorandom number generator of the item [1], the shift register may include a first flip flop circuit (101), a second flip flop circuit (102) arranged at the post stage of the first flip flop circuit, and a third flip flop circuit (103) arranged at the post stage of the second flip flop circuit. The shift amount changing circuit (154) includes a selector (112) for selectively providing an output signal of the first flip flop circuit and an output signal of the second flip flop circuit to the third flip flop circuit in response to a signal supplied from the outside of the pseudorandom number generator. By selectively supplying the output signal of the first flip flop circuit and the output signal of the second flip flop circuit to the third flip flop circuit by the selector, the shift amount can be easily changed.

[3] In the pseudorandom number generator of the item [1], the shift amount changing circuit may include a logic gate for performing logic operation between a clock signal and a signal provided from the outside of the pseudorandom generator. In this case, the shift amount is changed according to a clock signal.

[4] A data communication apparatus (200) as a representative embodiment of the present invention includes: a CPU (202) capable of executing a fetched instruction; a communication module (201) enabling transmission/reception of a data communication signal under control of the CPU; and a pseudorandom number generator (208) for generating a pseudorandom number for use in a process in the CPU or a process performed under control of the CPU. The pseudorandom number generator includes: a shift register (151) in which a plurality of flip flop circuits (101 to 107) are coupled to each other and which enables shifting operation synchronously with a clock signal; a first involvement circuit (152) for making a value of an operation code of an instruction which is executed by the CPU reflected in the pseudorandom number; a second involvement circuit (153) for making the data communication signal reflected in the pseudorandom number via a feedback path capable of feeding back a signal on the output side of the shift register to the input side of the shift register; and a shift amount changing circuit (154) capable of changing a shift amount in the shift register in response to the data communication signal. By changing the shift amount in the shift register in accordance with a control signal supplied from the outside of the pseudorandom number generator by the shift amount changing circuit, it becomes difficult to make outputs of the pseudorandom number generator the same. By using such a pseudorandom number generator, leak analysis resistance can be improved.

[5] The data communication apparatus of the item [4], the first involvement circuit may include: a first exclusive-OR gate (122) for obtaining exclusive OR of the operation code of the instruction decoded by the CPU; a second exclusive-OR gate (125) for obtaining exclusive OR between an output signal of the first exclusive-OR gate and the data communication signal; and a third exclusive-OR gate (126) for obtaining exclusive OR between an output signal of the second exclusive-OR gate and an output signal of a predetermine flip flop circuit in the shift register, and supplying the obtained exclusive OR to a second flip flop circuit arranged at the post stage of the predetermined flip flop circuit.

[6] In the data communication apparatus of the item [4], the second involvement circuit may include a fourth exclusive-OR gate (121) for obtaining exclusive OR between a signal on the output side of the shift register and a data communication signal handled in the communication module and supplying the obtained exclusive OR to a third flip flop circuit arranged on the input side of the shift register.

[7] In the data communication apparatus of the item [4], the shift amount changing circuit may include selectors (111 to 117) capable of switching a flip flop circuit involved in the shifting operation in the shift register in response to the data communication signal.

In the data communication apparatus of the item [4], the shift amount changing circuit may include a logic gate (401) for performing logic operation between the data communication signal and the clock signal, and the shift amount in the shift register can be changed by supply of an output of the logic gate to a predetermined flip flop circuit in the shift register.

[9] In the data communication apparatus of the item [8], the logic gate may be an AND gate for obtaining AND between the data communication signal and the clock signal.

[10] The first involvement circuit includes: pseudorandom number generators (601 to 606 and 607) for generating a pseudorandom number; a fifth exclusive-OR gate (122) for making an operation code of an instruction decoded by the CPU reflected in the pseudorandom number generated by the pseudorandom number generator; a sixth exclusive-OR gate (125) for obtaining exclusive-OR between an output signal of the pseudorandom number generator and the data communication signal; and a seventh exclusive-OR gate (126) for obtaining exclusive OR between an output signal of the sixth exclusive-OR gate and an output signal of a predetermined flip flop circuit in the shift register and supplying the obtained exclusive OR to a flip flop circuit arranged at the post stage of the predetermined flip flop circuit.

[11] The data communication apparatus of the item [4] can be formed over a single semiconductor substrate.

2. Description of Embodiments

The embodiments will be described more specifically.

Figure 1:
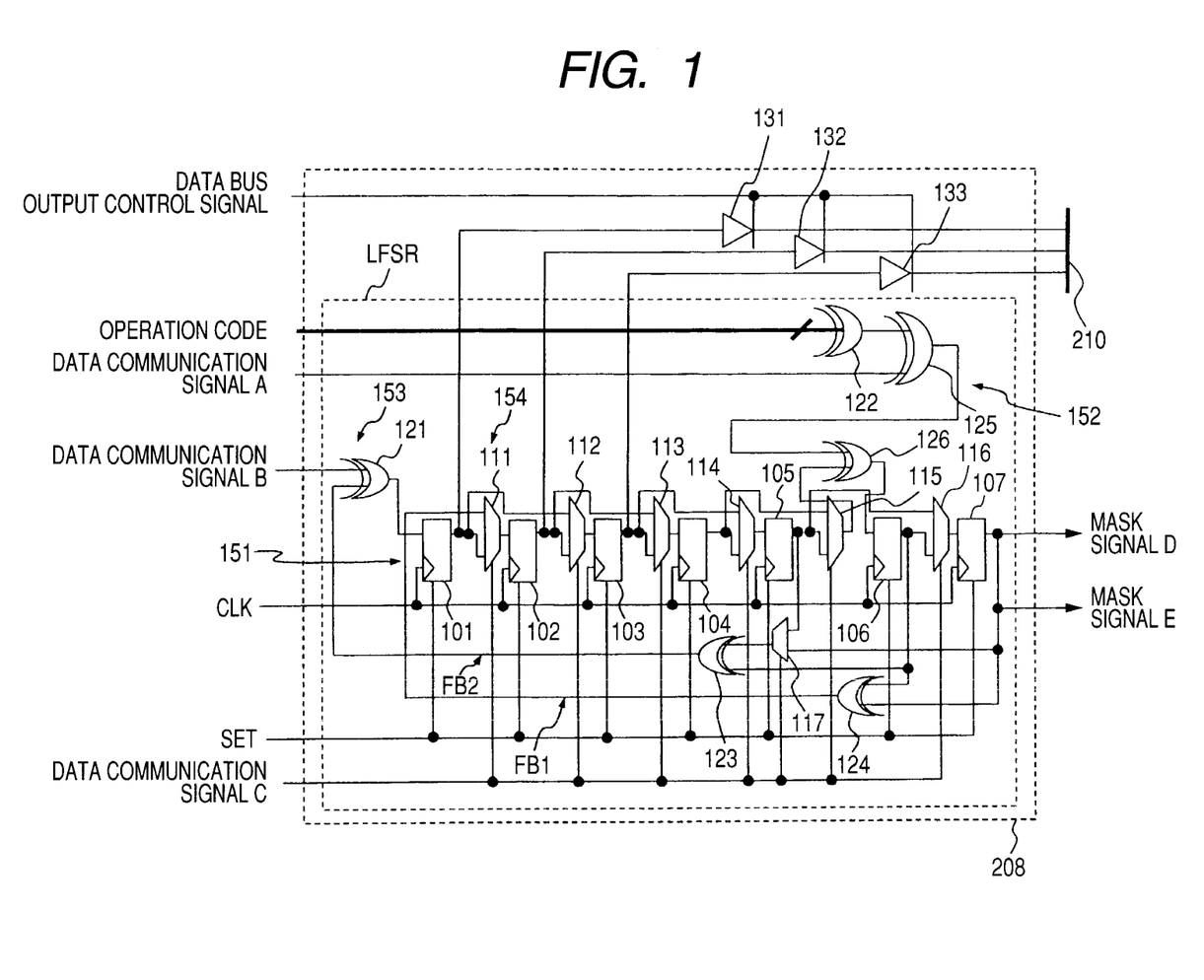
FIG. 1 is a circuit diagram showing a configuration example of a number generator included in a microcomputer as an example of a data communication apparatus of the present invention.
Figure 2:
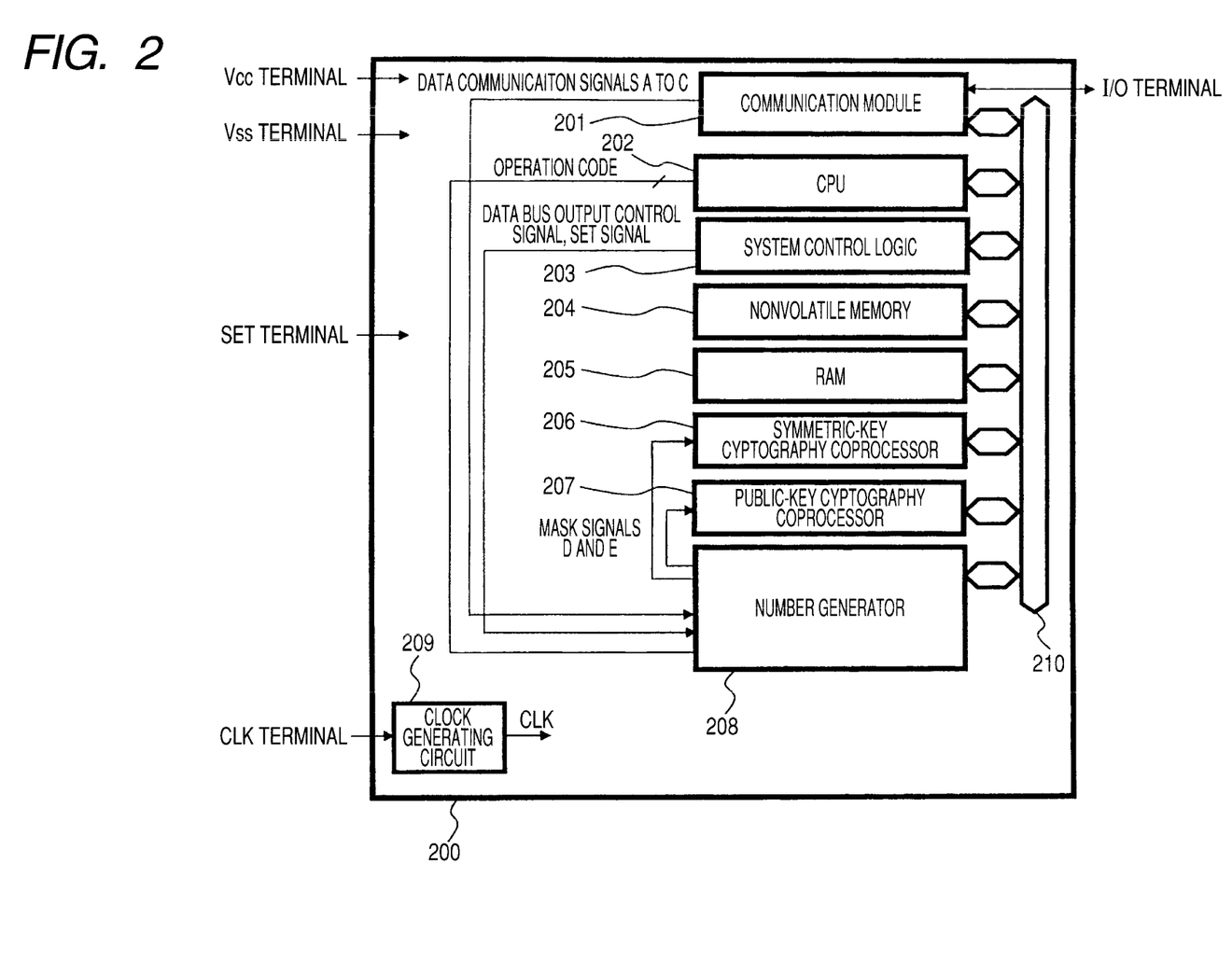
FIG. 2 is a block diagram showing a general configuration example of the microcomputer.

FIG. 2 shows a microcomputer (also called a microprocessor, a data processor, a data processing apparatus, or the like) as an example of a data communication apparatus of the present invention. A microcomputer 200 shown in FIG. 1 is formed, although not limited, by a known semiconductor integrated circuit manufacturing technique, on a single semiconductor substrate such as a single-crystal silicon substrate. The microcomputer 200 shown in FIG. 1 includes a communication module 201, a CPU (Central Processing Unit) 202, a system control logic 203, a nonvolatile memory 204, a RAM 205, a symmetric-key cryptography coprocessor 206, a public-key cryptography coprocessor 207, and a number generator 208 which are coupled to each other via a bus 210 so that signals can be transmitted/received. The number generator (Random number generator) 208 has the function of generating a pseudorandom number and is an example of a pseudorandom number generator.

The communication module 201 is coupled to an apparatus on the outside of the microcomputer 200 via an I/O terminal so that various data communication signals A to C can be transmitted/received to/from the external apparatus. The various data communication signals A to C are also transmitted to the number generator 208. Data to/from the outside is transmitted/received to/from the internal circuits (the CPU 202 and the internal memory 205) via the bus 210 or a dedicated signal line. The signal is called a data communication signal. In the example of FIG. 2, three data communication signals A to C couple the communication module 201 and the number generator 208. In the case where the microcomputer 200 is applied to a contact-type IC card, usually, there is only one I/O terminal. Consequently, for example, a serial signal received from the outside is serial-to-parallel converted to a plurality of bits, or the same value is used for a plurality of signals. The microcomputer 200 is applied to a non-contact IC card in a similar manner. The communication module outputs the data communication signals A to C on the basis of a signal input from the outside via an I/O terminal or a signal input via the bus. An embedded microcomputer (for a mobile terminal or for a reader/writer) in the security field or the like has a plurality of I/O terminals. In this case, different signals corresponding to the I/O terminals may be used. The CPU 202 fetches an instruction from the nonvolatile memory 204 via the bus 202, decodes it, and executes the decoded instruction. The nonvolatile memory 204 is an ROM (Read Only Memory), an EEPROM (Electrically Erasable and Programmable Read Only Memory) flash memory, or the like. In the nonvolatile memory 204, a program executed by the CPU 202 and the like is stored. The RAM 205 can be accessed at random by the CPU 202 and is used as a work area of arithmetic processing in the CPU 202. The CPU 202 identifies an instruction from information obtained from the bus 210 and obtains an operation code (a bit string of the instruction). The value is also transmitted as internal information of the microcomputer 200 via a dedicated line to the number generator 208. The system control logic 203 generates signals for controlling the operation of the microcomputer 200 such as a data bus output control signal and a set signal SET. To perform cryptographic processing at high speed, the coprocessors 206 and 207 are mounted in addition to the CPU 202. In the case where it is desired to eliminate dependency between data such as a key and current consumption in a module handling ciphers such as the CPU 202, a value output from the number generator 208 is used. The value is transmitted as mask signals D and E to the symmetric-key cryptography coprocessor 206 and the public-key cryptography coprocessor 207. In some cases, the value is transmitted to the CPU 202 via the bus 210.

A clock generating circuit 209 is provided. The clock generating circuit 209 generates a clock signal CLK for the inside of the chip on the basis of an external clock signal fetched via a CLK terminal. The clock signal CLK for the inside of the chip does not always have the same frequency as that of the outside. An external interface of an IC card may vary according to a type in which an oscillator is mounted, a non-contact type, or the like. There is a case that the frequency of the clock signal CLK for the coprocessors is different from that of the clock signal CLK for the inside of the chip. In this case, a method of using the clock signal CLK of high speed as the clock signal CLK of the number generator, a method of preparing a number generator capable of outputting signals synchronously with the clock signals CLK, and the like can be employed.

Further, the microcomputer 200 is provided with a Vcc terminal and a Vss terminal for receiving operation power source voltages for the components and a SET terminal for fetching a set signal.

FIG. 1 shows a configuration example of the number generator 208.

The number generator 208 shown in FIG. 1 includes, although not limited, an LFSR and tri-state buffers 131 to 133 for outputting a pseudorandom output (mask signal) of the LFSR to the CPU 202 via the bus 210. To the LFSR, the value of the operation code, the data communication signals A to C, the clock signal CLK, and the set signal SET are input. The mask signals D and E are output from the LFSR. The tristate buffers 131 to 133 are made conductive when the data bus output control signal becomes the high level. In this state, the pseudorandom output of the LFSR is output to the bus 210 via the tristate buffers 131 to 133.

The LFSR includes a shift register 151, a first feedback path FB1, a second feedback path FB2, a first involvement circuit 152, a second involvement circuit 153, and a shift amount changing circuit 154.

The shift register 151 is obtained by coupling a plurality of flip flop circuits 101 to 107. Each of the flip flop circuits 101 to 107 has a data input terminal for fetching data, a data output terminal for outputting data, a set terminal for fetching the set signal SET, and a clock terminal for fetching a clock signal. When the set signal SET is set to the high level, the plural flip flop circuits 101 to 107 are initialized. When the set signal SET is set to the low level, the set state is cancelled. The clock signal CLK is transmitted to the clock terminal. In the shift register 151, data is shifted synchronously with the clock signal CLK. From the flip flop circuit 107, the mask signals D and E are obtained.

The first feedback paths FB1 and FB2 are paths each for feeding back a signal on the output side of the shift register 151 to the input side.

The shift amount changing circuit 154 has the function of changing the shift amount in the shift register 151 in response to the data communication signal C and includes selectors 111 to 117. The selector 111 is provided to selectively transmit a signal transmitted via the first feedback path FB1 and an output signal of the flip flop circuit 101 to the flip flop circuit 102 at the post stage in response to the data communication signal C. The selector 112 is provided to selectively transmit an output signal of the flip flop circuit 101 and an output signal of the flip flop circuit 102 to the flip flop circuit 103 at the post stage in response to the data communication signal C. The selector 113 is provided to selectively transmit an output signal of the flip flop circuit 102 and an output signal of the flip flop circuit 103 to the flip flop circuit 104 at the post stage in response to the data communication signal C. The selector 114 is provided to selectively transmit an output signal of the flip flop circuit 103 and an output signal of the flip flop circuit 104 to the flip flop circuit 105 at the post stage in response to the data communication signal C. The selector 115 is provided to selectively transmit an output signal of the flip flop circuit 104 and an output signal of the flip flop circuit 105 to an exclusive-OR gate 126 in response to the data communication signal C. The selector 116 is provided to selectively transmit an output signal of the flip flop circuit and an output signal of the flip flop circuit 106 to the flip flop circuit 107 at the post stage in response to the data communication signal C.

The selector 117 is provided to selectively transmit an output signal of the flip flop circuit 105 and an output signal of the flip flop circuit 107 to an exclusive-OR gate 123 at the post stage in response to the data communication signal C.

The first involvement circuit 152 has the function of making an operation code of an instruction decoded by the CPU 202 reflected in the mask signals (pseudorandom number outputs) D and E and includes exclusive-OR gates 122, 125, and 126. The exclusive-OR gate 122 performs exclusive-OR operation on the operation code made of a plurality of bits. An output of the exclusive-OR gate 122 is transmitted to the exclusive-OR gate 125 at the post stage. The exclusive-OR gate 125 performs exclusive-OR operation between an output of the exclusive-OR gate 122 and the data communication signal A. An output of the exclusive-OR gate 125 is transmitted to the exclusive-OR gate 126 at the post stage. The exclusive-OR gate 126 performs exclusive-OR operation between an output signal of the exclusive-OR gate 125 and the selector 115. An output of the exclusive-OR gate 126 is transmitted to the flip flop circuit 106.

The second involvement circuit 153 has the function of making the data communication signal B reflected in the mask signals (pseudorandom number outputs) D and E via the feedback path FB2 and includes an exclusive-OR gate 121. The exclusive-OR gate 121 performs exclusive-OR operation on a signal transmitted from the exclusive-OR gate 123 via the feedback path FB2 and the data communication signal A. The operation result is transmitted to the flip flop circuit 101.

Figure 3:
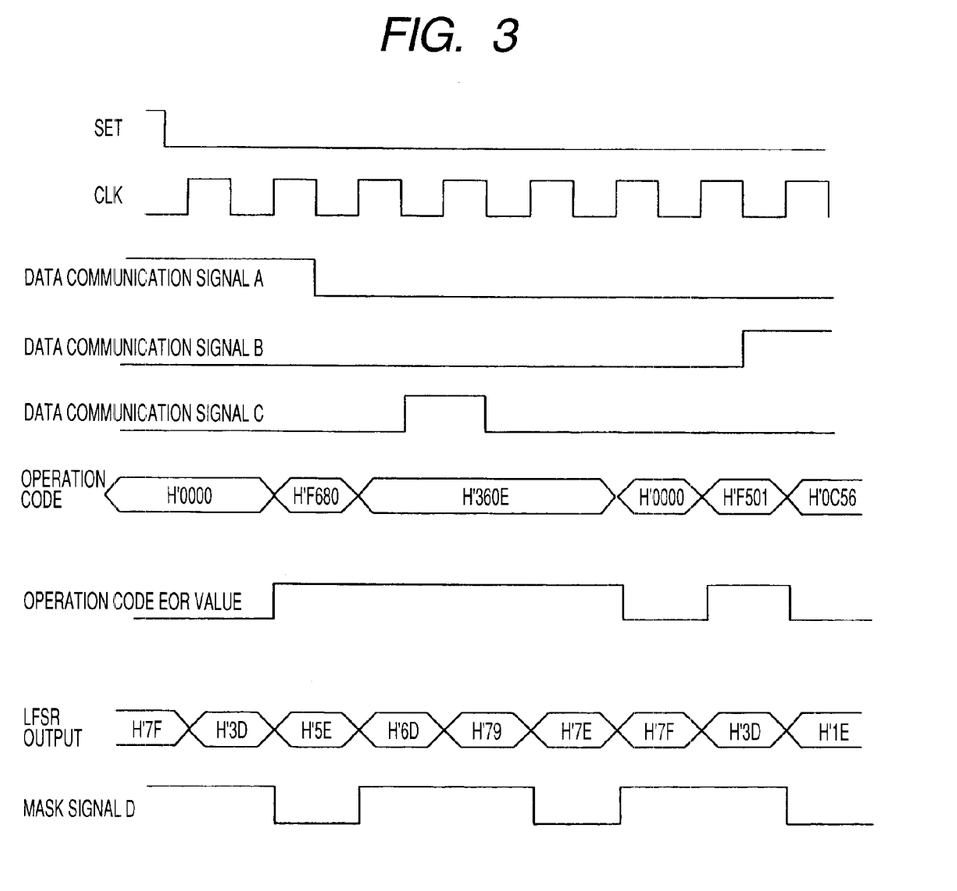
FIG. 3 is an operation timing chart of main components in the number generator shown in FIG. 1.

FIG. 3 shows operation timings of the main components in the configuration illustrated in FIG. 1.

When the set signal SET is set to the high level, the plural flip flop circuits 101 to 107 are initialized. When the set signal set is set to the low level, the set state is cancelled. The clock signal CLK is transmitted to the clock terminal. In the shift register 151, data shift is performed synchronously with the clock signal CLK. It is assumed that the logic state of each of the data communication signals A, B, and C changes as shown in FIG. 3. The operation code is not always generated for each clock. The operation code is updated at an arbitrary timing in accordance with the arithmetic processing in the CPU 202. It is assumed that the operation code changes like "H'0000", "H'F680", "H'360E", "H'0000", "H'F501", and "H'0C56" in hexadecimal. The operation code EOR value is obtained by exclusive-OR operation on the operation code in the exclusive-OR gate 122. When the operation code is expressed in binary form, in the case where the number of bits whose logic value is "1" is an even number, the logic value of the operation code EOR value is "0". On the other hand, in the case where the number of bits whose logic value is "1" is an odd number, the logic value of the operation code EOR value is "1". An output of the LFSR is obtained by expressing outputs of the flip flop circuits 101 to 107 in hexadecimal. In the embodiment, the output is changed like "H'7F", "H'3D", "H'5E", "H'6D", "H'79", "H'7E", "H'7F", "H'3D", and "H'1E" synchronously with the clock signal CLK.

By the embodiment, the following effects can be obtained.

(1) The shift amount changing circuit 154 is provided, the shift amount in the shift register 151 is controlled by the data communication signal C and, on the basis of the value, one-bit shift or two-bit shift is determined. Since the shift amount is changed in response to the data communication signal C, it becomes difficult to make outputs of the LFSR the same, and it becomes difficult for a leak analysis attacker to accurately predict intermediate data. By improving randomness of a pseudorandom number, leak analysis resistance is improved.

(2) Further, by making the data communication signal B and the operation code reflected in the mask signals (pseudorandom number outputs) D and E in a state where the shift amount is changed by the data communication signal C, it becomes further difficult to make outputs of the LFSR the same. It becomes further difficult for a leak analysis attacker to accurately predict intermediate data. Thus, the leak analysis resistance is further improved.

Figure 4:
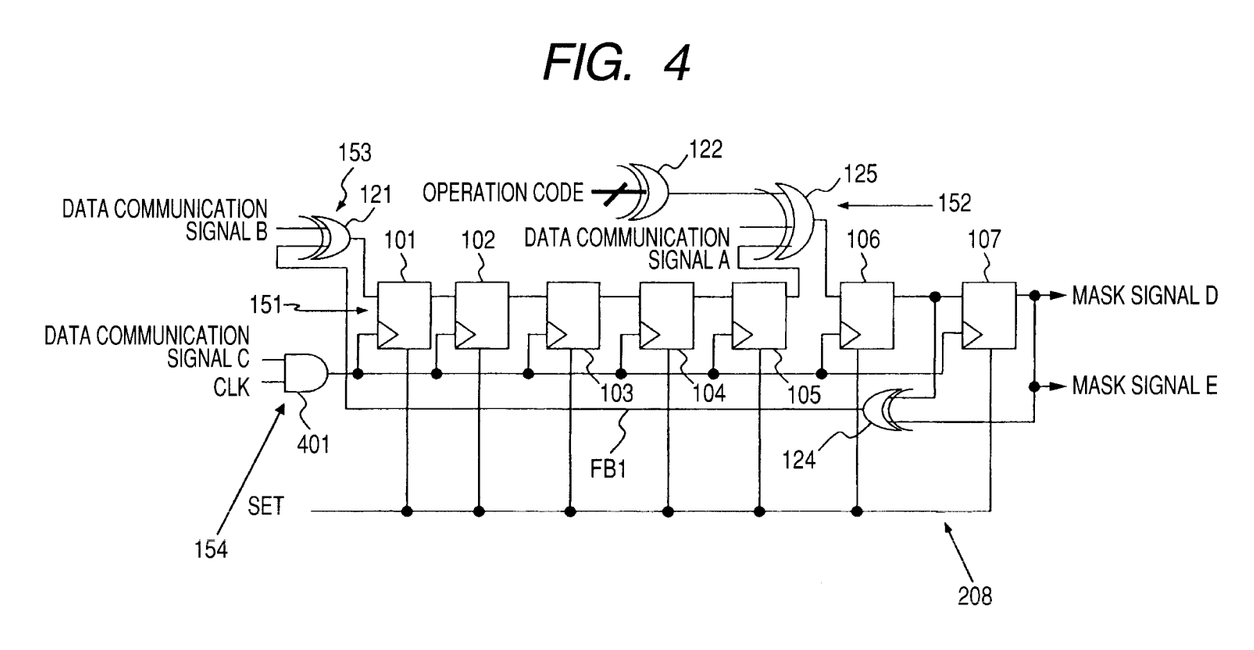
FIG. 4 is a circuit diagram showing another configuration of the number generator.

FIG. 4 shows another configuration example of the number generator 208.

The number generator 208 shown in FIG. 4 largely differs from that shown in FIG. 1 with respect to the configuration of the shift amount changing circuit 154. That is, in FIG. 4, the shift amount changing circuit 154 includes a logic gate 401 for performing logic operation between the data communication signal C and the clock signal. The logic gate 401 is, for example, a 2-input AND gate. An output signal of the AND gate 401 is transmitted to the clock terminal of each of the flip flop circuits 101 to 107.

In FIG. 4, the tristate buffers 131 to 133 and the like in FIG. 1 are not shown.

Figure 5:
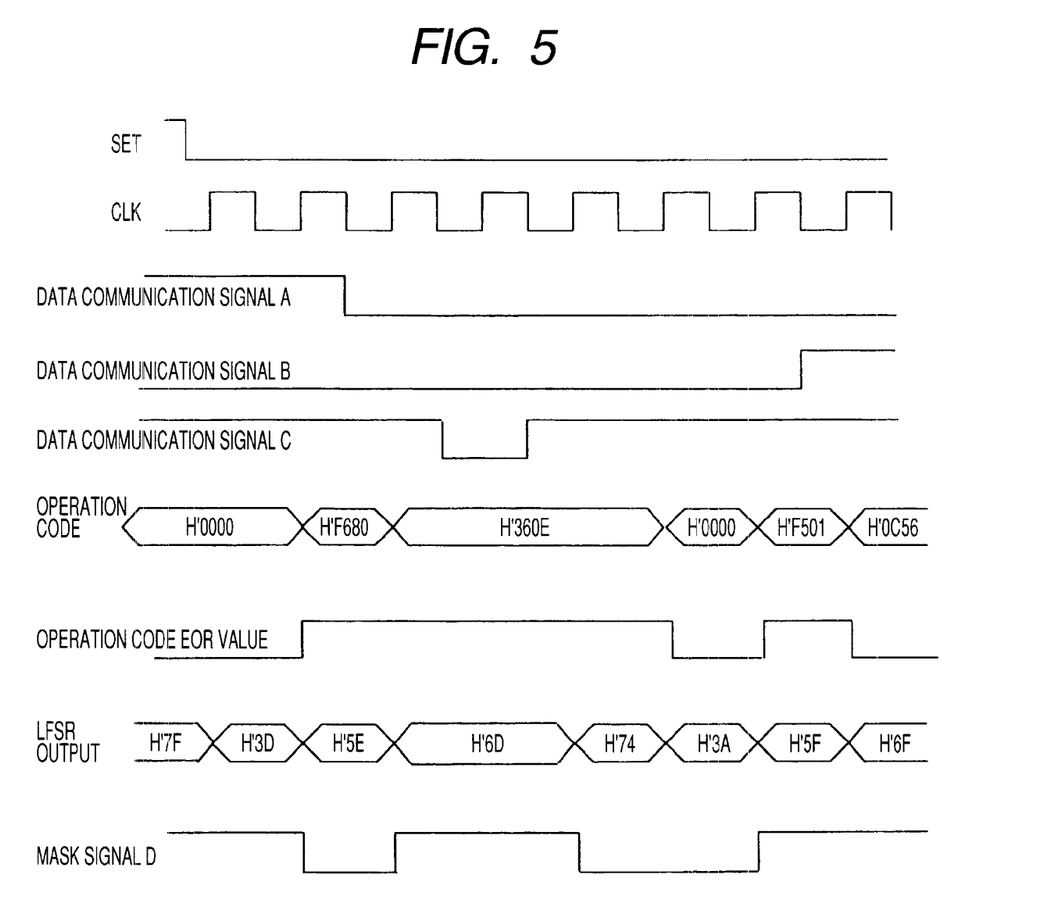
FIG. 5 is an operation timing chart of main components in the number generator shown in FIG. 4.

FIG. 5 shows operation timings of the main components in the configuration illustrated in FIG. 4.

The basic operation of the configuration shown in FIG. 4 is similar to that shown in FIG. 1 but is different with respect to the following point. The shift amount changing circuit 154 includes the AND gate 401, and the shift amount in the shift register 151 is changed in response to the data communication signal C. Outputs of the LFSR (outputs of the flip flop circuits 101 to 107 expressed in hexadecimal) are "H'7F", "H'3D", "H'5E", "H'6D", "H'74", "H'3A", "H'5F", and "H'6F" which are different from those shown in FIG. 1. In the configuration shown in FIG. 4, the shift amount changing circuit 154 includes the AND gate 401. As compared with the configuration of FIG. 1, the number of devices can be reduced.

Figure 6:
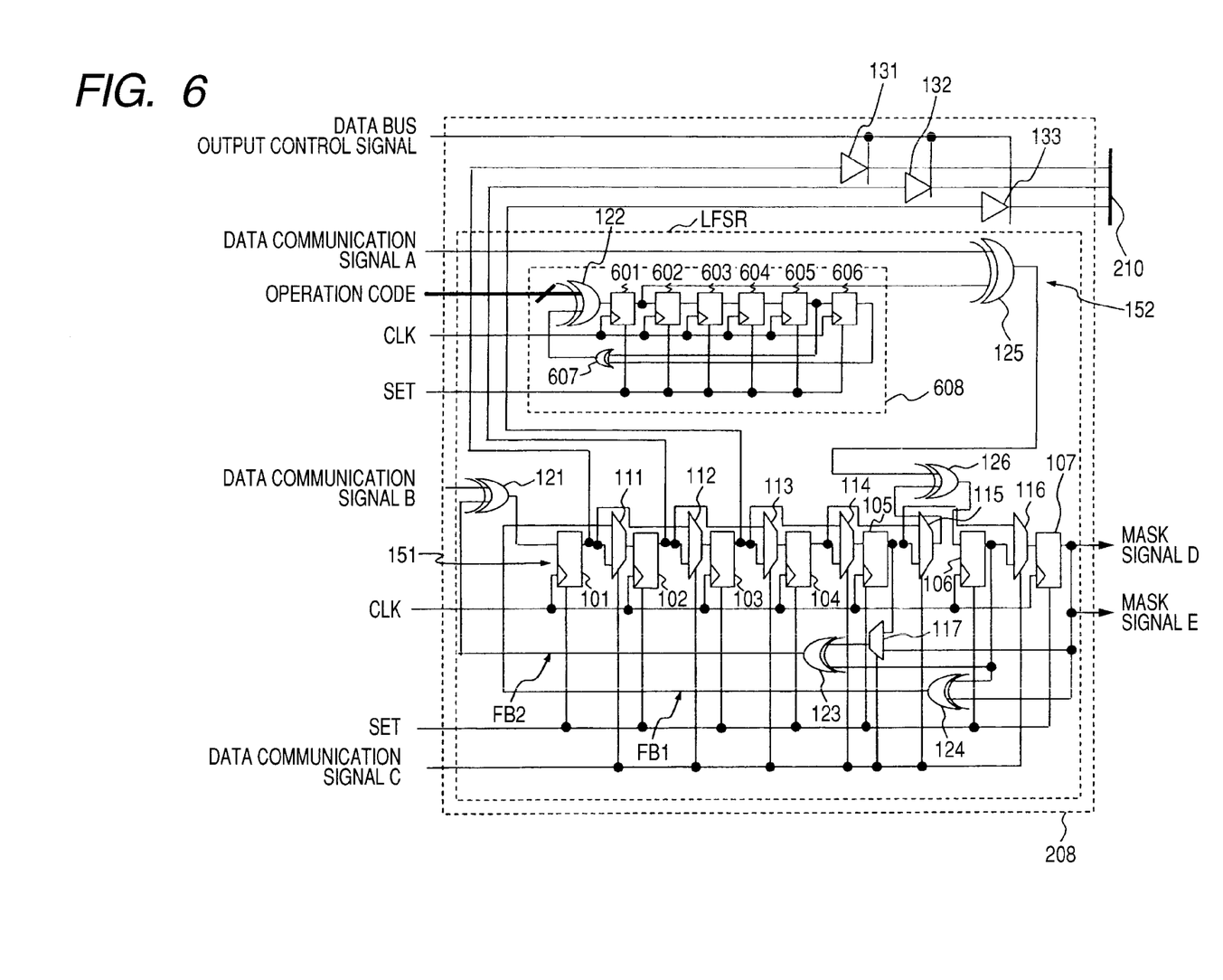
FIG. 6 is a circuit diagram showing another configuration of the number generator.

FIG. 6 shows another configuration example of the number generator 208.

The number generator 208 shown in FIG. 6 is largely different from that shown in FIG. 1 with respect to the point that a pseudorandom number generating circuit obtained by coupling flip flop circuits 601 to 606 and an exclusive-OR gate 607 is provided at the post stage of the exclusive-OR gate 122. An output of the flip flop circuit 601 is transmitted to the exclusive-OR gate 125. In the exclusive-OR gate 125, exclusive-OR operation between the data communication signal A and an output signal of the flip flop circuit 601 is performed. A result of the operation is transmitted to the exclusive-OR gate 126 at the post stage. A circuit obtained by coupling the exclusive-OR gate 122, the flip flop circuits 601 to 606, and the exclusive-OR gate 607 is called an "operation code LFSR" 608 for convenience.

Figure 7:
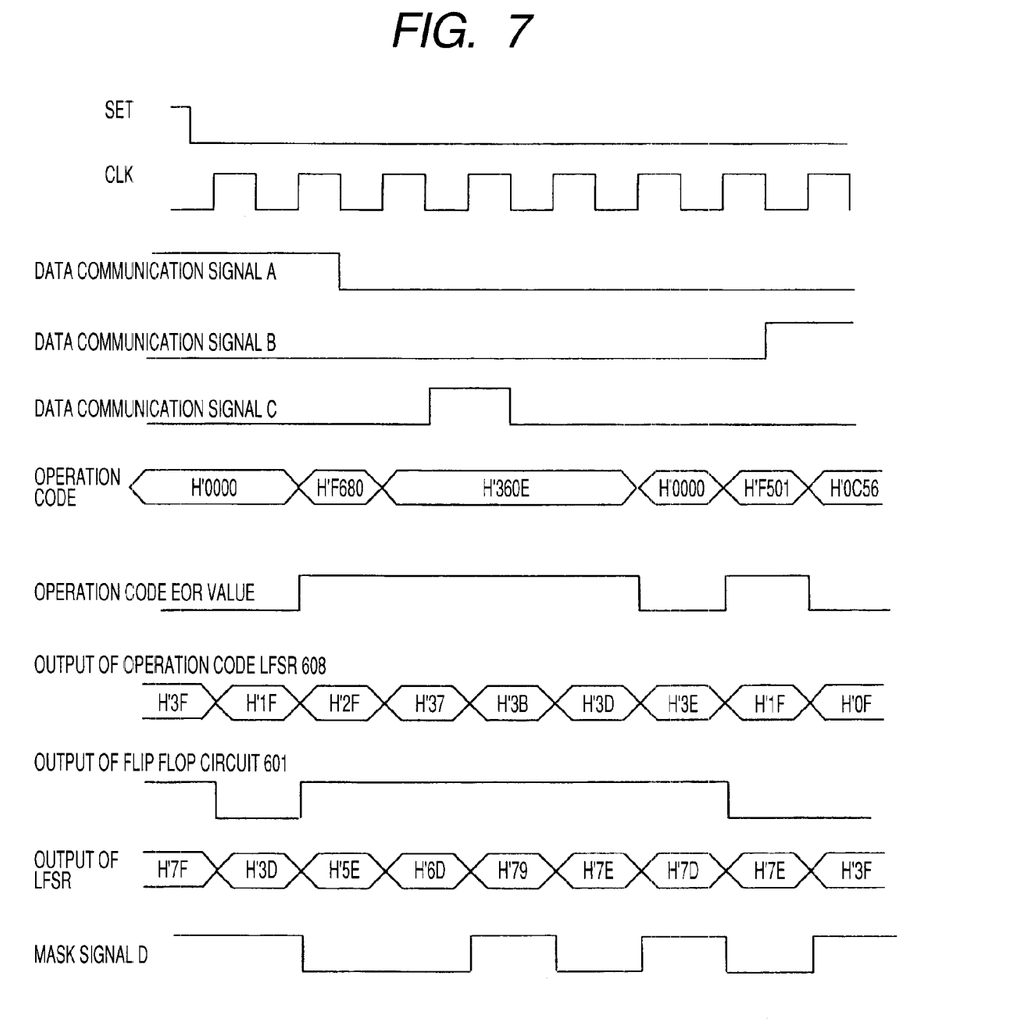
FIG. 7 is an operation timing chart of main components in the number generator shown in FIG. 6.

FIG. 7 shows operation timings of the main components in the configuration illustrated in FIG. 6.

An operation code is not always updated at each clock. Therefore, in the configuration shown in FIG. 1, as long as the operation code is not updated, an output of the exclusive-OR gate 122 is not updated. In the configuration shown in FIG. 6, an operation code LFSR 608 obtained by coupling the flip flop circuits 601 to 606 and the exclusive-OR gate 607 is provided. Regardless of updating of the operation code, the probability that an output of the exclusive-OR gate 122 is updated increases. Therefore, the probability in the case where an output is updated and that in the case where an output is not updated are balanced, so that it becomes more difficult for a leak analysis attacker to perform analysis as compared with the configuration shown in FIG. 1.

The inventions achieved by the inventors of the present invention have been concretely described. However, obviously, the invention is not limited to the embodiments but can be variously modified without departing from the gist.

In the above, the case where the present invention achieved by the inventors herein is applied to a microcomputer in the field of utilization as the background has been mainly described. However, the invention is not limited to the case but can be widely applied to a data communication apparatus.

The present invention can be applied at least under condition that a pseudorandom number is generated by shifting a signal in the shift register synchronously with a clock signal.

What is claimed is:

1. A data communication apparatus comprising:
   a CPU capable of executing a fetched instruction;
   a communication module enabling transmission/reception of a data communication signal under control of the CPU; and
   a pseudorandom number generator for generating a pseudorandom number for use in a process in the CPU or a process performed under control of the CPU,
   wherein the pseudorandom number generator includes
   a shift register in which a plurality of flip flop circuits are coupled to each other and which enables shifting operation synchronously with a clock signal;
   a first involvement circuit for making a value of an operation code of an instruction which is executed by the CPU reflected in the pseudorandom number;
   a second involvement circuit for making the data communication signal reflected in the pseudorandom number via a feedback path capable of feeding back a signal on the output side of the shift register to the input side of the shift register; and
   shift amount changing circuitry capable of changing a shift amount in the shift register in response to the data communication signal,
   wherein the shift amount changing circuitry includes a selector capable of switching a flip flop circuit involved in the shifting operation in the shift register to change a shift amount in the shift register in response to the data communication signal,
   wherein the first involvement circuit includes
   a first exclusive-OR gate for obtaining exclusive OR of the operation code of the instruction decoded by the CPU;
   a second exclusive-OR gate for obtaining exclusive OR between an output signal of the first exclusive-OR gate and the data communication signal; and
   a third exclusive-OR gate for obtaining exclusive OR between an output signal of the second exclusive-OR gate and an output signal of a predetermine flip flop circuit in the shift register, and supplying the obtained exclusive OR to a second flip flop circuit arranged at the post stage of the predetermined flip flop circuit.

2. The data communication apparatus according to claim 1, wherein the second involvement circuit includes a fourth exclusive-OR gate for obtaining exclusive OR between a signal on the output side of the shift register and a data communication signal handled in the communication module and supplying the obtained exclusive OR to a third flip flop circuit arranged on the input side of the shift register.

3. The data communication apparatus according to claim 1, wherein the shift amount changing circuitry includes a logic gate for performing logic operation between the data communication signal and the clock signal, and
   wherein the shift amount in the shift register can be changed by supply of an output of the logic gate to a predetermined flip flop circuit in the shift register.

4. The data communication apparatus according to claim 3, wherein the logic gate is an AND gate for obtaining AND between the data communication signal and the clock signal.

5. The data communication apparatus according to claim 1 formed over a single semiconductor substrate.

6. A data communication apparatus comprising:
   a CPU capable of executing a fetched instruction;
   a communication module enabling transmission/reception of a data communication signal under control of the CPU; and
   a pseudorandom number generator for generating a pseudorandom number for use in a process in the CPU or a process performed under control of the CPU,
   wherein the pseudorandom number generator includes
   a shift register in which a plurality of flip flop circuits are coupled to each other and which enables shifting operation synchronously with a clock signal;
   a first involvement circuit for making a value of an operation code of an instruction which is executed by the CPU reflected in the pseudorandom number;
   a second involvement circuit for making the data communication signal reflected in the pseudorandom number via a feedback path capable of feeding back a signal on the output side of the shift register to the input side of the shift register; and
   shift amount changing circuitry capable of changing a shift amount in the shift register in response to the data communication signal,
   wherein the shift amount changing circuitry includes a selector capable of switching a flip flop circuit involved in the shifting operation in the shift register to change a shift amount in the shift register in response to the data communication signal, and
   wherein the first involvement circuit includes
   a pseudorandom number generator for generating a pseudorandom number;
   a first exclusive-OR gate for making an operation code of an instruction decoded by the CPU reflected in the pseudorandom number generated by the pseudorandom number generator;
   a second exclusive-OR gate for obtaining exclusive-OR between an output signal of the pseudorandom number generator and the data communication signal; and
   a third exclusive-OR gate for obtaining exclusive OR between an output signal of the second exclusive-OR gate and an output signal of a predetermined flip flop circuit in the shift register and supplying the obtained exclusive OR to a flip flop circuit arranged at the post stage of the predetermined flip flop circuit.

* * * * *